United States Patent

Kolodziej

[15] 3,645,312

[45] Feb. 29, 1972

[54] AUTOMOBILE TIRE INNER SUPPORT

[72] Inventor: Henry W. Kolodziej, 475 Atlantic Ave., Matawan, N.J. 07747

[22] Filed: Aug. 11, 1969

[21] Appl. No.: 848,972

[52] U.S. Cl. ............................................................. 152/158
[51] Int. Cl. ........................................................ B60c 17/04
[58] Field of Search ................ 152/158; 301/64 SD; 292/241

[56] References Cited

UNITED STATES PATENTS

| 1,454,249 | 5/1923 | Melanowski | 301/64 SD |
| 3,025,898 | 3/1962 | Opel | 152/158 |
| 3,394,749 | 7/1968 | Lindley | 152/158 |
| 3,397,728 | 8/1968 | McCrary et al. | 152/158 |
| 3,420,288 | 1/1969 | Unruh | 152/158 |
| 3,451,457 | 6/1969 | Leyer | 152/158 |
| 3,519,053 | 7/1970 | Lindley | 152/158 |
| 2,422,723 | 6/1947 | Fisher | 292/204 |
| 2,989,108 | 6/1961 | Gore | 152/158 |

Primary Examiner—Arthur L. La Point
Assistant Examiner—Robert Saifer
Attorney—Victor J. Evans & Co.

[57] ABSTRACT

A structure of annular form, fabricated of arcuate sections fastened together, is mounted within a tire and supported with respect to the rim thereof out of engagement with the periphery of the tire a distance sufficient to allow normal deflection of the tire, the device coming into operation to prevent the breaking of a tire casing upon loss of a predetermined amount of pressure in the tire or in the event of the puncturing or blowing out of the tire, the device thus carrying the load of the vehicle until the tire can be changed or suitable repairs made thereto.

2 Claims, 18 Drawing Figures

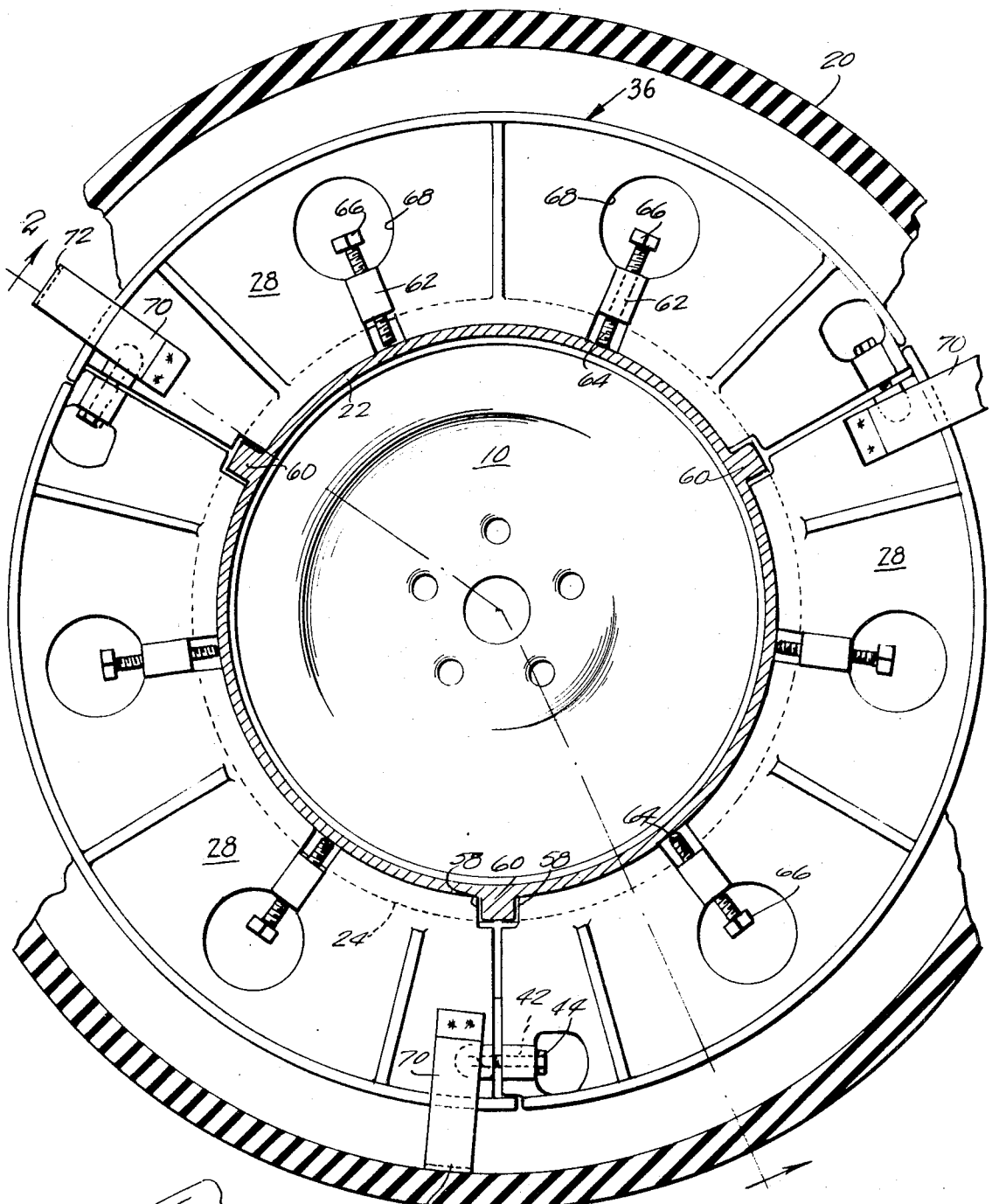
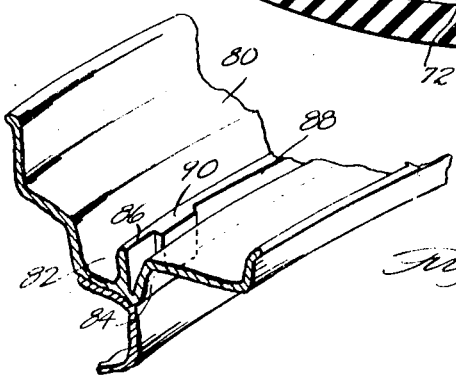
INVENTOR.
HENRY W. KOLODZIEJ
BY
Victor J. Evans &co
ATTORNEYS

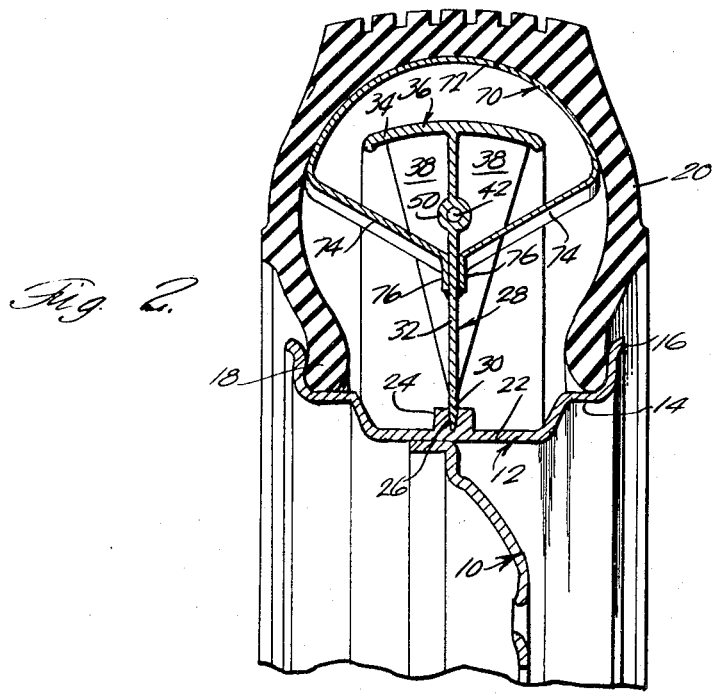
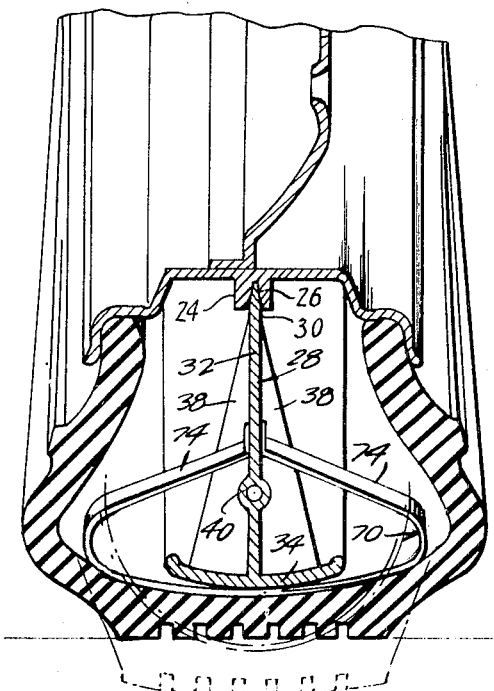
Fig. 2.
INVENTOR.
HENRY W. KOLODZIEJ

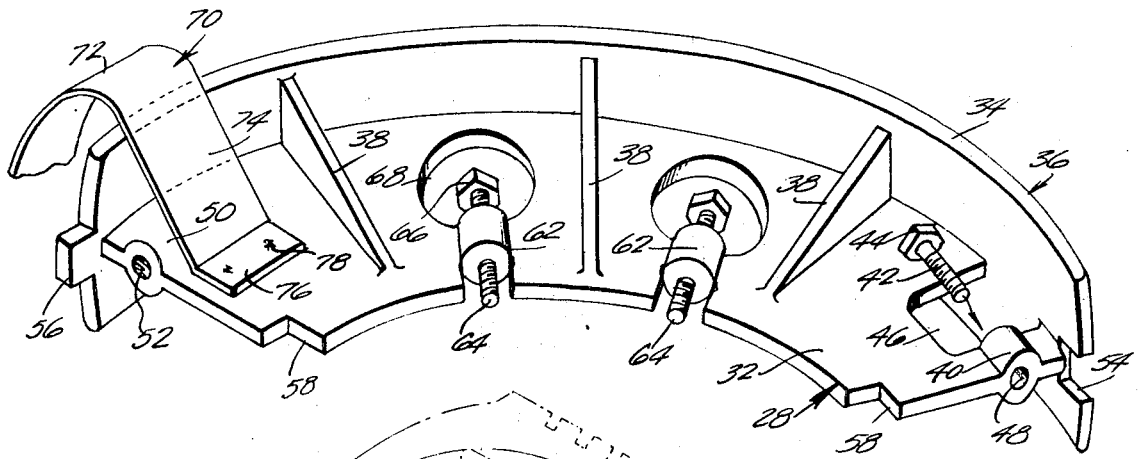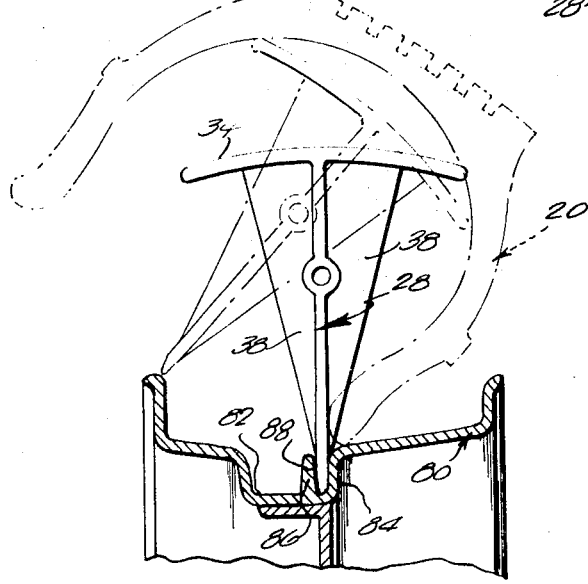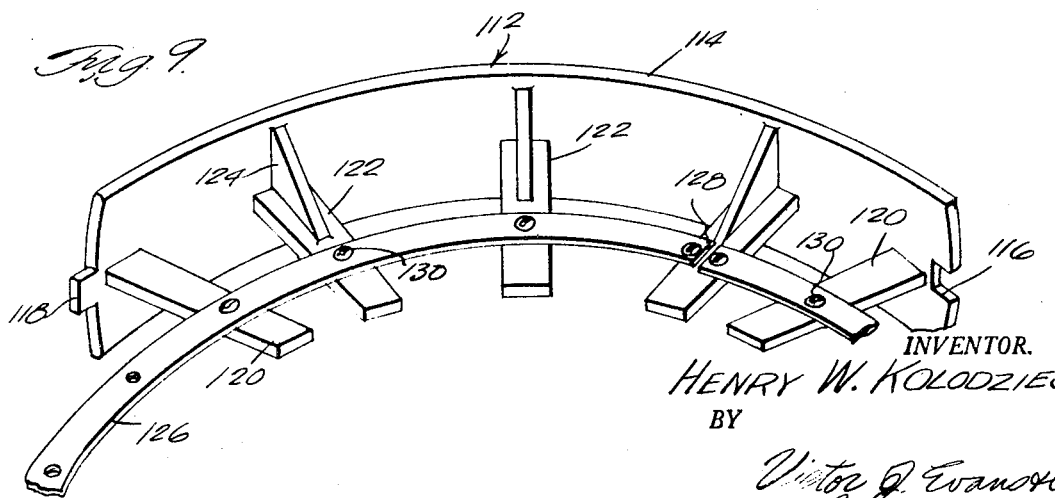

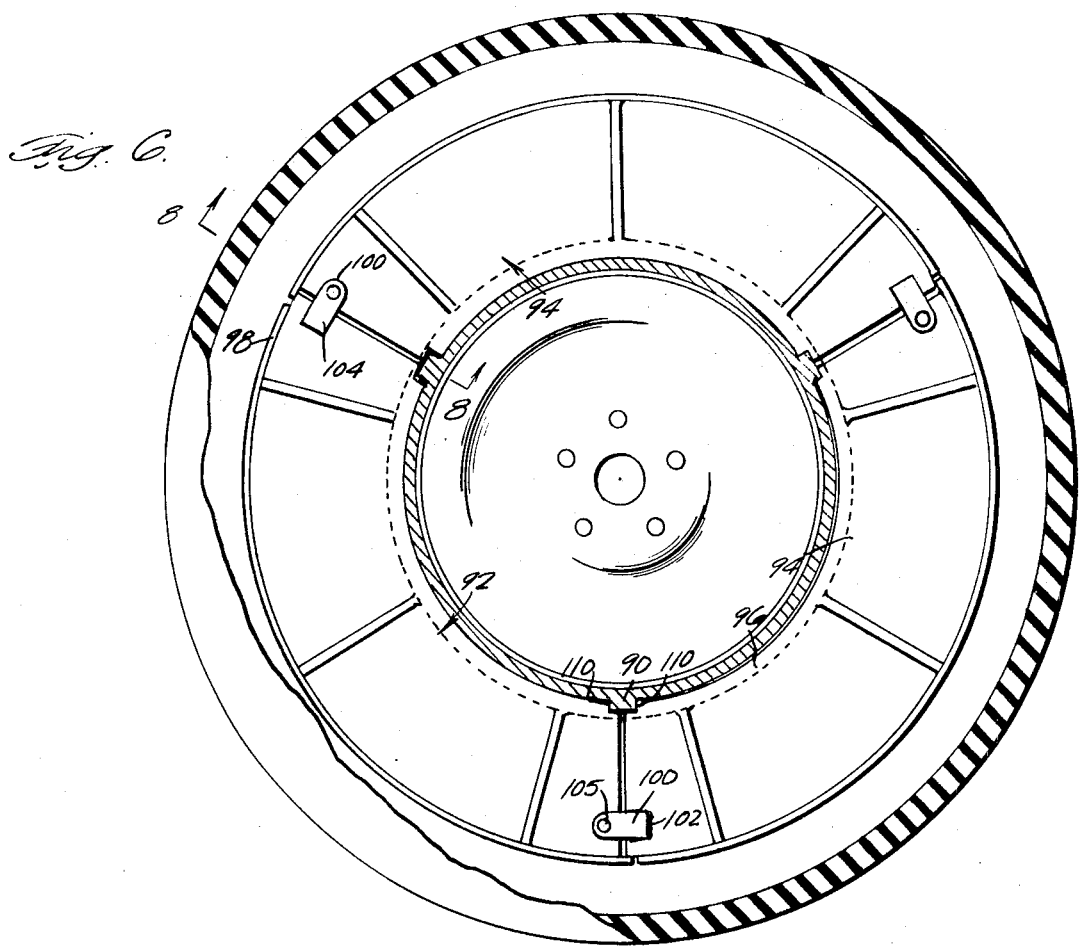
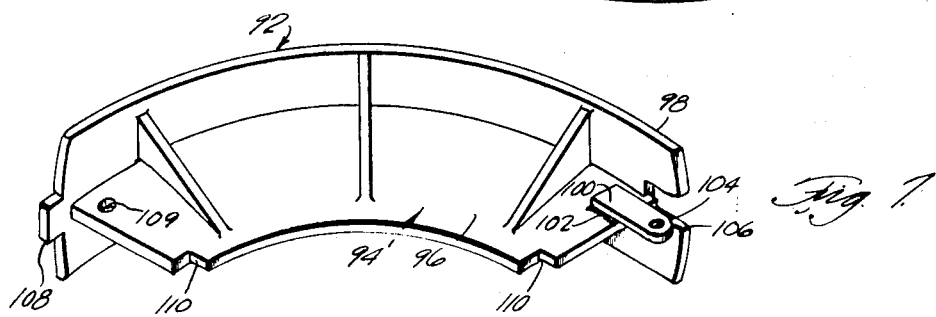
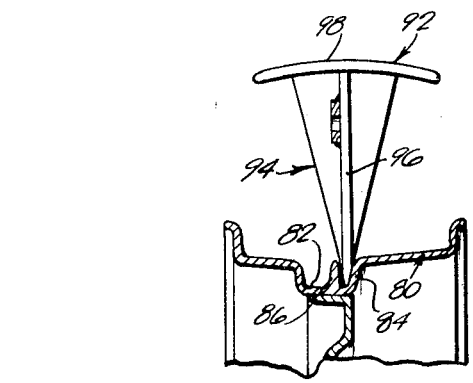

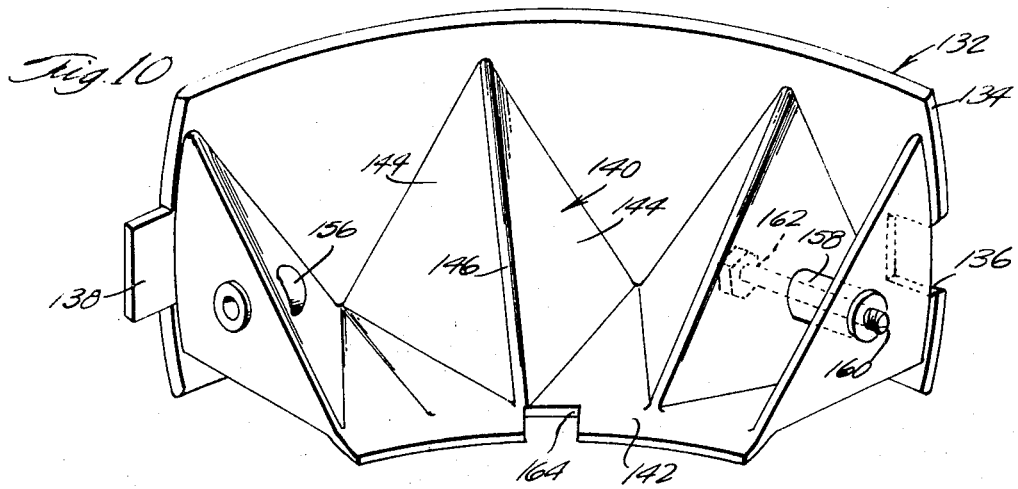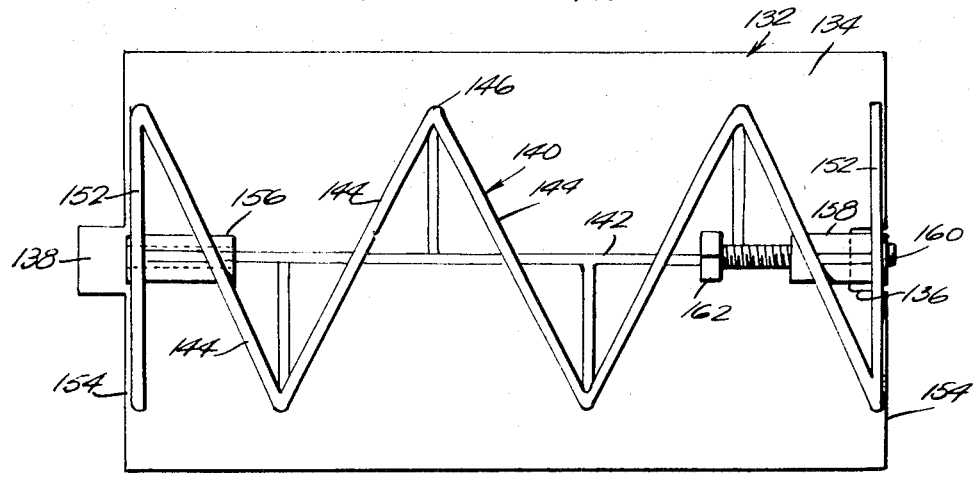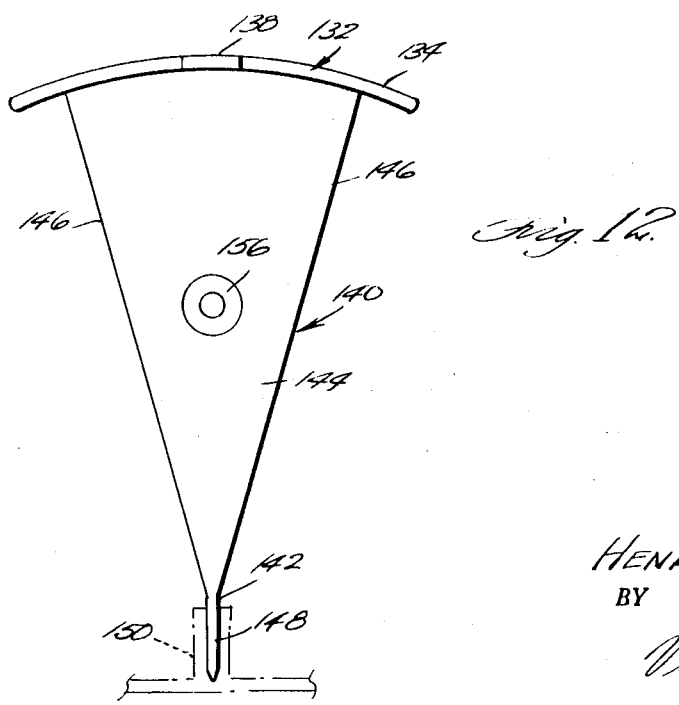

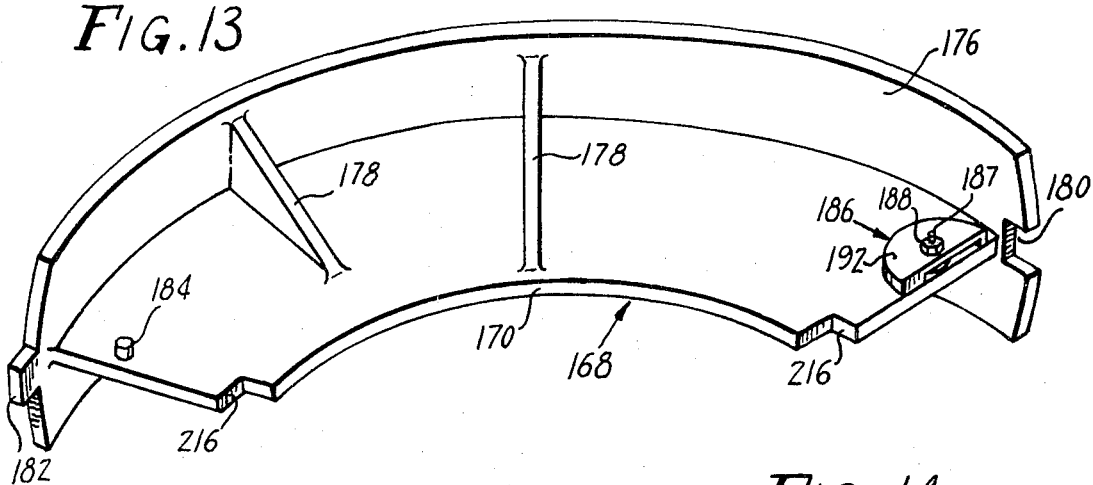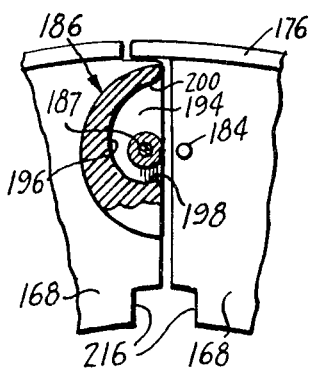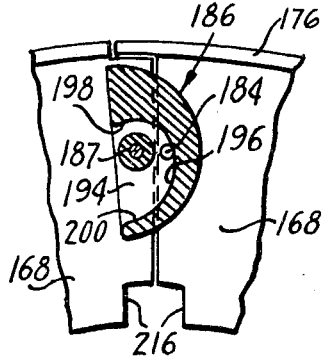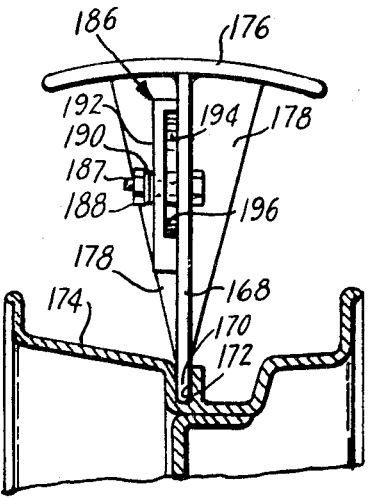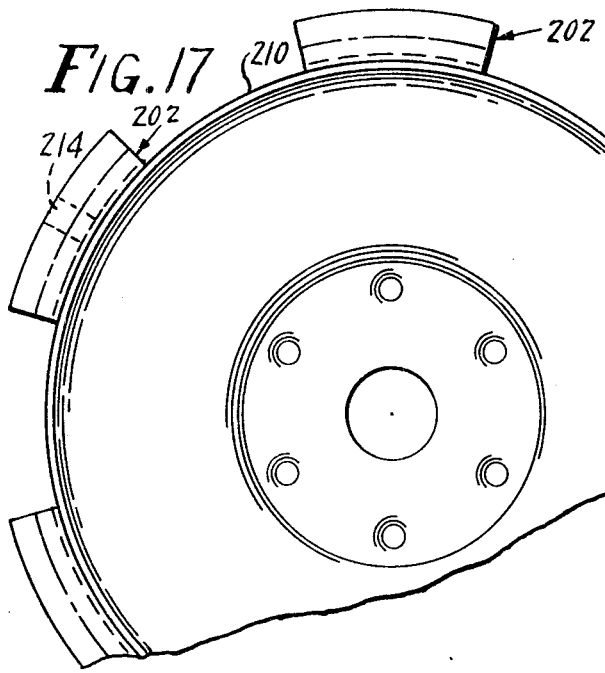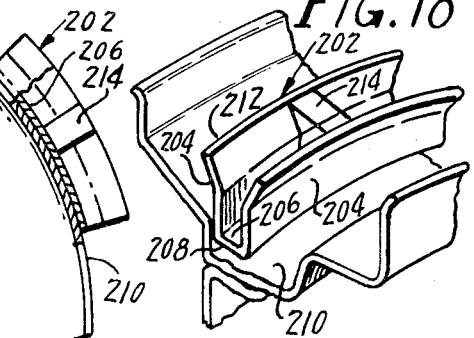
INVENTOR.
HENRY W. KOLODZIEJ
BY
Victor J. Evans & Co
ATTORNEYS.

AUTOMOBILE TIRE INNER SUPPORT

BACKGROUND OF THE INVENTION

The invention relates to the field of tubeless automobile tires usually mounted on one-piece rims. It is well known that upon loss of air from a tire, the sidewalls thereof are sharply creased and are easily broken through if the driving of the vehicle continues. Thus the tire is ruined and must be replaced with another tire.

A number of devices have been proposed for insertion within the tire to carry the load on the tire by seating against the tread portion thereof if the tire loses a predetermined amount of air pressure or if the tire is punctured or blows out. In such case, the device, having its outer periphery spaced from the tread portion of the tire, will contact therewith and support the load without allowing the sharp creasing and breaking of the sidewalls of the tire. Thus the vehicle may be driven at a reduced rate of speed to a safe area to make repairs or change tires. Most of these prior devices are relatively complicated to manufacture and may require substantial alterations of the rims of the tires. Moreover, some of these prior constructions, in turning corners with the tire deflated, will rock on the rim even at reduced speeds, out of their normal position laterally of the wheel, thus allowing a sidewall of the tire to be sharply creased and damaged.

SUMMARY OF THE INVENTION

Several forms of the present invention are illustrated and described in the accompanying drawings. All forms include the same common features of providing an inner tire supporting structure fabricated of arcuate sections around the wheel to provide for the easy assembly of the device within the tire, the sections being secured to each other after assembly within the tire. In each case, a tire rim of substantially standard construction is provided, preferably centrally of the width thereof, with a groove in which the radial supporting portion of the device has its radially inner edge seated, thus providing a solid foundation for a ringlike integral peripheral tire-engaging portion. The latter portion of the device is normally substantially spaced from the rim portion of the tire so that the latter is subject to radial deflection within normal limits in the normal use of the vehicle. If a slow leak develops in the tire or in the valve so that a loss of air occurs down to a predetermined point, the peripheral portion of the present device will engage the tread portion of the tire, thus bearing the load imposed on the tire. This limits the radially inward movement of the tire tread, the thrust being transmitted directly to the tire rim by the radial portion of the device, thus preventing excessive bending of the sidewalls of the tire. The same function takes place if the tire is punctured or suffers a blowout, and in either case, the car may be driven at a reasonable but slower speed to a service station for the changing or repairing of the tire.

In the preferred form of the invention, adjacent segments of the device are secured together by screws. The segments are initially spaced from each other so that the drawing together circumferentially of the segments causes them to contract radially as far as the supporting groove in the rim will permit, whereby the device is effectively tightly clamped against the rim against any movement relative thereto. In the same form of the invention, radial screws carried by the segments exert radially inward pressure against the rim to tend to expand it, and the two sets of screws, tightened as much as possible, assure the unitary fixing of the segments relative to each other in rigid relationship to the rim of the tire.

In another form of the invention, the radial supporting portion of the device is provided at one end of each segment with a welded flange projecting over the next adjacent segment for securing the segments together after individual insertion within the tire.

As a further feature of several forms of the invention, the groove in the rim of the tire is provided at spaced points with lugs engageable in slots in the radial load supporting portions of the device to positively fix the device against circumferential movement relative to the rim.

In another form of the invention, the outer arcuate tire-engaging portion of the device is welded to a radial load-supporting portion which may be stamped of rigid sheet metal bent back and forth to bear against the arcuate rim to adequately support loads across the width thereof.

BRIEF DESCRIPTION OF THE DRAWINGS

FIG. 1 is a section through a portion of a tire casing showing the present device in position therein;

FIG. 2 is a section generally on line 2—2 of FIG. 1;

FIG. 3 is a perspective view of one of the segments of the device;

FIG. 4 is a fragmentary radial sectional view through one side of the rim showing the manner of inserting the present device in the tire;

FIG. 5 is a fragmentary sectional perspective of a portion of the tire rim showing one of the lugs for preventing circumferential movement of the device;

FIG. 6 is a view similar to FIG. 1 showing a modified form of the device;

FIG. 7 is a perspective view of one of the segments of the device shown in FIG. 6;

FIG. 8 is a fragmentary section on line 8—8 of FIG. 6;

FIG. 9 is a perspective of one of the segments of a further modified form and associated elements;

FIG. 10 is a perspective of a segment of a further modified form of the device;

FIG. 11 is an inside elevation of the segment shown in FIG. 10;

FIG. 12 is an end elevation of the same;

FIG. 13 is a perspective view of a supporting segment of another modified form of the device;

FIG. 14 is a section taken radially between two of said supporting segments;

FIG. 15 is a fragmentary face view of the adjacent ends of two of the segments, parts being broken away with the locking device in unlocked position;

FIG. 16 is a similar view showing the locking device in locked position;

FIG. 17 is a fragmentary section through a modified type of rim; and

FIG. 18 is a sectional perspective view of a portion of such rim.

DESCRIPTION OF THE PREFERRED EMBODIMENTS

Referring to FIGS. 1, 2 and 3, the numeral 10 designates a conventional motor vehicle wheel body on which is mounted a rim 12 of generally standard type having shoulders 14 and bead flanges 16 adapted to engage the beads 18 of a conventional tubeless tire 20. The rim 12 is provided with a drop center 22 provided preferably centrally thereof with radially outwardly extending flanges 24 forming an annular groove 26 for a purpose to be described.

The preferred form of the device comprises a radially arranged preferably planiform annular plate 28 formed in sections as described below and having its radially inner annular edge 30 tapered to facilitate its insertion into the groove 26. The groove 26 may, if desired, have its sides parallel and the edge 30 may be similarly shaped to fit therein.

The plate 28, as stated, is formed of a plurality of segments to facilitate insertion of the device in the tire, and one of these segments is shown in perspective in FIG. 3. The section of the plate 28 shown in such figure is indicated by the numeral 32 and is surrounded by an arcuate supporting plate portion 34, these portions of the segments combining, when assembled, to provide an annular band 36, the periphery of which is arranged radially inwardly of the tread portion of the tire as clearly shown in FIG. 2.

Gusset plates 38 are welded against both sides of each plate 32 and against the inner face of each arcuate plate 34.

Each segment of the device is provided adjacent one end with a boss 40, which is not internally threaded, and through which is insertable a screw 42 having a head 44. Each plate 32 is cut away as at 46 to permit the placing of the screw 42 in alignment with the opening 48 in the boss 40. The other end of each segment is provided with a boss 50 internally threaded as at 52 to receive the screw 42 of the next adjacent segment. One end of each arcuate plate 34 is notched as at 54 to receive a similarly shaped tongue projecting from the end of the next adjacent plate 34, thus locking the segments of the device against lateral movement relative to each other.

Each end of the radial plate 32 of each segment is notched as at 58, and each such notch, when the device is assembled, combines with the notch of the next adjacent plate to receive a lug 60 arranged in the groove 36, there being slight play between opposite edges of the lug 60 and the notches 58 for a purpose which will become apparent.

Each segment of the device is preferably provided with two radial bosses 62 internally threaded to receive a radial screw 64 each of which is provided with a head 66. Since each screw 64 is in the plane of the plate 32, this plate is apertured as at 68 to provide access to the head 66 of each screw 64.

Means is provided for dampening any vibration which may occur in the device between the segments thereof and between the device and the wheel rim. At spaced points around the wheel are arranged steel bands 70, the outer peripheral portions 72 of which are curved to correspond to the curvature of the inner surface of the tread portion of the tire. Inwardly of such curved portion, the steel bands slope downwardly and radially inwardly as at 74 and have their ends 76 contacting with opposite sides of the plate 28 and spot-welded thereto as at 78 or otherwise secured in position.

In FIG. 4 and 5 of the drawings, the same device is shown mounted on a somewhat different type of generally standard wheel 80 wherein the dropped portion 82 of the wheel is offset to one side thereof forming a shoulder 84. Spaced from such shoulder is a flange 86 combining with the shoulder to form a groove 88 corresponding to the groove 26 to receive the radially inner edge of the plate 28. In FIG. 5 the groove 88 is shown as being provided with a lug 90 corresponding to the lugs 60 previously described and engageable in the notches 58 to fix the device against annular movement.

In FIG. 6, 7 and 8, a somewhat different type of device is shown wherein the annulus comprising the device is indicated as a whole by the numeral 92 and is formed of assembled arcuate sections 94 each made up of an arcuate plate 96 lying in a radial plane and forming the load-supporting unit as is true of the elements 32 of the plate 28 previously described. Each plate 94 is provided with an arcuate transversely curved outer plate 98, these plates cooperating to form an annular tire-engaging portion as is true of the plate sections 34 previously described. The ends of the radial plate sections 96 are arranged adjacent each other as in FIG. 6 and are adapted to be circumferentially fixed to each other by relatively narrow flanges 100, one end of each of which is welded as at 102 to the adjacent plate 96 and has its other end 104 overlying the next adjacent plate and secured thereto as at 105 by bolts, screws or any other fastening elements. The fastening elements 105 are adapted to pass through openings 109 in the plate portion 96 of the next adjacent segment. The respective ends of each arcuate plate 98 are provided with notches 106 and projections 108, each projection 108 being receivable in the notch 106 of the next adjacent segment.

The device in FIGS. 6, 7 and 8 is shown as being mounted on the same type of wheel as in FIG. 4 and the parts thereof have been indicated by the same reference characters. The lug 90, shown in FIG. 5, is engageable in adjacent cooperating notches 110 in the extremities of the inner edge of each plate 94 to prevent relative rotational movement of the device with respect to the rim, this construction being identical with the elements 58 and 60 in FIG. 1.

Another modification of the invention is shown in FIG. 9 wherein the device is made up of a plurality of complementary segments 112 each comprising an outer arcuate plate 114 forming part of an annulus when the device is assembled, as will become apparent. One end of each plate 114 is provided with a notch 116 adapted to receive a projection 118 on the adjacent end of the adjacent segment.

Each plate 114 has welded thereto a pair of radially inwardly projecting arms 120, and between its ends, the plate 114 has welded thereto a plurality of similar arms 122 having reinforcing gusset plates 124 welded thereto and to the plate 114.

When the device is assembled in the tire, the successive segments 112 are secured together by a circular band 126 split as at 128. This band is attached against corresponding faces of all of the arms 120 and 122 by screws 130.

Another somewhat different modification of the invention is shown in FIGS. 10, 11 and 12. In this form of the invention, the annulus comprising the device is made up of a plurality of complementary segments 132 each having an outer arcuate plate 134, as before, each provided at one end with a notch 136 and at its other end with a projection 138. Obviously, each notch 136 receives the projection 138 of the next adjacent plate to fix the plates 136 against lateral movement.

The load-supporting portion of each segment is indicated as a whole by the numeral 140 and this unit is made up of a rigid die-stamped sheet metal unit having an inner plate portion 142 lying in a radial plane with respect to the wheel. Outwardly of this plate portion, the unit 140 is stamped to provide back-and-forth angular portions 144. These portions join each other in bends 146, opposite ones of which (FIG. 12) converge toward and meet the flat plate portion 142, the inner edge 148 of which is arranged in a rim groove 150 corresponding to the similar grooves previously described. At its ends, the unit 140 terminates in transverse plate portions 152 parallel to the end edges 154 of the plate section 134.

At one end of each segment 132 a sleeve 156 projects through the end plate portion 152 and the adjacent plate portion 144 and is internally threaded. At the other end of the segment, a similar sleeve 158 is welded in position and slidably receives a screw 160 having a head 162. Each screw is threadable in the adjacent sleeve 156 of the next adjacent segment. Each flat plate portion 142 is notched as at 164 to receive one of the lugs 60 or 90.

A further modification of the invention, particularly related to the means for locking the supporting segments to each other, is shown in FIGS. 13 to 16, inclusive. Referring to FIGS. 13 to 16, inclusive, the numeral 168 designates the planiform supporting plate of one of the segments employed for carrying the load of the vehicle, and each plate 168 has a radially inner arcuate edge 170 adapted to be received in the groove 172 of the wheel 174. The radially outer edge of each plate 168 carries an arcuate plate 176 adapted to form a segment of an annular band arranged within the tire as is true of the band 36 in FIG. 1. Each plate 168 is preferably rigidly braced relative to its band 176 by gusset plates 178. One end of each band portion 176 is notched as at 180 to receive a projection 182 at the opposite end of the band portion of the next adjacent segment, this arrangement corresponding to the arrangement shown for example in FIGS. 3 and 9.

One end of each plate 168 is provided with a rigid pin 184 engageable by a locking device indicated as a whole by the numeral 186 at the opposite end of the plate. This locking device is pivoted to the plate 168 by a bolt 187 and has a nut 188 thereon engaging against a compression spring 190 between the nut 188 and the adjacent face 192 of the locking device 186. Inside this locking device is formed a cavity 194, the wall of which is formed as an eccentric cam 196 having a low point 198 progressing eccentrically to a high point 200. The parts are brought together as shown in FIG. 15 and with the nut 188 loosened, the locking device 186 is rotated clockwise from the position shown in FIG. 15 to the position shown in FIG. 16. The cam surface 196 obviously cams the adjacent edges of the plates 168 toward each other. A tool preferably is employed in the last stages of rotation of the locking device to secure a tight-clamping action, whereupon the nut 188 is tightened to clamp the locking device 186 against its plate 168. The tightening of these locking devices obviously reduces the diameter of the annulus formed by the segments of the support, the edges of the plates 168 being moved from the position shown in FIG. 15 to the position shown in FIG. 16. When the tightening has been carried on to its maximum extent, the inner edges 170 of the plates 168 obviously will be tightly seated in the groove 172.

In the forms of the invention previously described, the rim groove for receiving the inner edges of the arcuate supporting plates has been shown and described as being continuous and annular. This arrangement, however, need not be employed. On the contrary, a series of arcuate members each indicated as a whole by the numeral 202 may be employed as shown in FIGS. 17 and 18. Where three of the arcuate supports are employed as shown in FIG. 1, it is preferred that six of the members 202 be used, that is, two for each arcuate supporting member. Each member 202 is substantially U-shaped in cross section and comprises sidewalls 204 which may be parallel to each other to provide a groove 206, and the bottom wall 208 of each member 202 may be welded in the drop center portion 210 of the rim. The upper edges of the sidewalls 204 preferably flare outwardly as at 212 to facilitate the placing of the plates 168 for example, in the groove 206.

If six of the members 202 are employed in conjunction with three supporting units, every other one of the members 202 will be provided therein with a lug 214 corresponding to the lug 90 of FIG. 5 to be received in the notches of the associated supporting plate, such as the notches 216 shown in FIG. 13. These correspond to the notches shown in other forms of the invention as will be apparent.

OPERATION

The operation of the form of the device shown in FIGS. 1 to 5, inclusive, is as follows: When the tire is put on the rim it will initially be placed in position on the rim and one bead thereof, such as the left-hand bead in FIG. 4, will be forced outwardly and one of the segments will be inserted at an angle as shown in broken lines in FIG. 4. This segment is then swung inwardly toward the center of the tire and moved radially inwardly so that the inner edge of the load-supporting plate 32 will be inserted in the groove 88, as shown in solid lines in FIG. 4. The wheel is then turned for the insertion in the same manner of the next adjacent segment, followed by a repetition of the same operation for the third and last segment, assuming that three segments make up the annulus. It will be apparent that any number of segments may be employed. If the steel bands 70 are employed, these will be welded to the plate sections 32 prior to introduction in the tire in the manner shown in FIG. 4.

After all of the segments have been loosely assembled in the tire, the loose bead will be pulled outwardly at spaced points for the successive insertion of screws 42. A wrench is applied to the screwheads 44 to tighten the successive segments relative to each other. The ends of the segments are slightly spaced from each other, and the ends of the notches 58 are similarly slightly spaced from the respective lugs 60 so that when the screws 42 are tightened, the tightening action will not be limited by engagement of any edges of the device with each other. This tightening of the screws 42 obviously radially contracts the assembly so that the inner edges of the load-supporting plate 28 as a whole will be tightly wedged into the groove 88. The tapering of the inner edge of the plate 28 (FIG. 4) facilitates the entrance of the plate edge into the groove and provides a tight-wedging action. When the screws 42 have been completely tightened to provide a highly rigid engagement between the plate 28 and the wheel rim, the screws 64 are then tightened. The tendency of these screws is to expand the annulus comprising the device, but actual expansion cannot take place in view of the previous complete tightening of the screws 42. The screws 64, however, increase rigidity of the connection between the device and the rim.

The loose bead of the tire is now forced inwardly into position on the wheel rim, and the tire is ready to inflate. This inflation causes the tread portion of the tire to assume the position relative to the device as shown at the top of FIG. 2, there being a space between the plate 36 and the tread portion of the tire which allows for the normal deflection of the tire when travelling over a road surface. The use of the steel bands 70 is not necessary but is preferred to limit or completely prevent any vibration of the parts which might be objectionable. It will be obvious that the steel bands may be employed with any form of the invention illustrated.

In the event the tire loses air, for example, by a slow leak, the bottom of the tire may assume the shape shown at the bottom of FIG. 2. The radially outer portion of each steel band 70 adjacent the bottom of the tire will be deflected inwardly and will transmit the weight on the wheel to the plate 36, the radial plate 28 carrying the load on the tire and transmitting it to the rim 12. The same operation occurs in the event of a puncture or blowout through which all of the superatmospheric pressure in the air is lost. In such case, radially inward movement of the bottom of the tire as it moves over the road will be borne by the device. This prevents excessive sharp bending of the sidewalls of the tire with the consequent damage which always occurs to the tire under such conditions. In fact, as is well known, a relatively short running of a vehicle on a flat tire will completely ruin the tire, and accordingly, the tire is saved by the present device and the vehicle may be driven at a reasonable speed as far as necessary to a service station for the repairing of the tire or the placing of a spare tire on the rim.

Even if any of the screws should become slightly loose, the steel bands 70 will dampen vibration and no damage will occur. The lugs 60 will prevent any relative rotation of the present device on the rim.

The operation of each of the other forms of the invention is identical with that described and need not be described in great detail. In FIGS. 6, 7 and 8, the individual segments will be introduced in the tire in the manner described above, whereupon adjacent segments will be connected together by applying the screws 105. Lateral movement of the segments is prevented by engagement of the projections 108 in the notches 106, as is true of engagement of the projections 56 in the notches 54 of the form of the device previously described.

In FIG. 9, successive segments are placed within the tire, whereupon the split band 126 is inserted, and the screws 130 applied to fix the segments relative to each other circumferentially of the tire. The inner ends of the arms 120 and 122 will be inserted in the rim groove which will be similar to the groove 88 previously described.

The segments in FIGS. 10, 11 and 12 will be similarly successively inserted in the tire, and successive segments will be secured together and relatively contracted by the insertion and tightening of the screws 160. The die-stamped formation of the load-supporting unit of each segment 132 is a relatively economical operation to perform, and the form of the invention in FIGS. 10, 11 and 12 possesses the advantage of having a high degree of lateral resistance to forces applied against the device when rounding turns.

The operation of the form of the device shown in FIGS. 13 to 16, inclusive, will be apparent in view of the foregoing description thereof. The segments will be placed in position on the rim, whereupon the locking device 186 will be swung from the position shown in FIG. 15 to the position shown in FIG. 16 to contract the segments of the support circumferentially and radially, whereupon the nut 188 between each adjacent pair of segments will be tightened.

The operation of the form of the device shown in FIG. 18 will be identical with the forms previously described, the only difference being that instead of employing a continuous annular groove for receiving the inner edges of the supporting plates, a plurality of the circumferentially spaced members 202 will be employed. The adjacent ends of each pair of plates 168, for example, in FIG. 13, will lie in one of the members 202 having the lug 214 therein, and the intervening members 202 will engage the remaining plates 168 intermediate the ends thereof.

From the foregoing it will be apparent that each form of the invention is a highly desirable adjunct for use with tubeless tires to prevent damage thereto upon a predetermined loss of air pressure from the tire. The device performs no function whatever unless the tire loses air to the extent suggested, whereupon it functions to carry the load on the wheel having the deflated tire to prevent damaging and the probable ruining of the tire.

From the foregoing it will now be seen that there is herein provided an improved automobile tire inner support which accomplishes all of the objects of this invention and others, including many advantages of great practical utility and commercial importance.

As various embodiments may be made of this inventive concept, and as many modifications may be made in the embodiments hereinbefore shown and described, it is to be understood that all matter herein is to be interpreted merely as illustrative, and not in a limiting sense.

I claim:

1. An inner support for a tire mounted on a one-piece rim comprising an annulus within the tire, said annulus being made up of a plurality of circumferentially complementary sections each of which comprises a generally radial load supporting member and a rim at the radially outer extremity thereof and fixed thereto, said rim being spaced a distance from the tread portion of the tire to allow for normal deflection of the latter but to limit inward movement of the tire if deflated to a predetermined extent, said supporting member detachably engaging the rim and being fixed against lateral movement relative thereto, means for fixing said sections to each other, comprising circumferentially oriented lugs carried by said load-supporting members adjacent the ends thereof, a screw passing through each lug adjacent one end of each section and threaded into the adjacent lug of the next adjacent section, said sections having their ends slightly spaced whereby, when said screws are tightened, said annulus is contracted to cause a wedging of the radially inner edges of said load-supporting members with the rim and means cooperating between said rim and said load support members to prevent circumferential movement of said annulus, each load-supporting member provided with a radial screw having radial threaded connection therewith, said screws being adapted to be tightened against the rim after said sections have been drawn together to their limit by said first-named screws.

2. An inner support for a tire mounted on a one-piece rim comprising an annulus within the tire, said annulus being made up of a plurality of circumferentially complementary sections each of which comprises a generally radial load-supporting member and a rim at the radially outer extremity thereof and fixed thereto, said rim being spaced a distance from the tread portion of the tire to allow for normal deflection of the latter but to limit inward movement of the tire if deflated to a predetermined extent, said supporting member detachably engaging the rim and being fixed against lateral movement relative thereto, means for fixing said sections to each other, and means cooperating between said rim and said load support members to prevent circumferential movement of said annulus, each load-supporting member being radially planiform, and a resilient band spanning the outside of certain of said sections in engagement with the tire and having end portions extended radially inwardly and welded to said load support.

* * * * *